No. 651,771. Patented June 12, 1900.
E. C. RIMINGTON.
ELECTRICAL MEASURING INSTRUMENT.
(Application filed Jan. 27, 1900.)

(No Model.)

Witnesses.
Thos. Kirkpatrick

Inventor
Ernest Cecil Rimington
by Alexander & Co.
Attorneys

UNITED STATES PATENT OFFICE.

ERNEST CECIL RIMINGTON, OF LONDON, ENGLAND.

ELECTRICAL MEASURING INSTRUMENT.

SPECIFICATION forming part of Letters Patent No. 651,771, dated June 12, 1900.

Application filed January 27, 1900. Serial No. 3,025. (No model.)

*To all whom it may concern:*

Be it known that I, ERNEST CECIL RIMINGTON, a subject of the Queen of Great Britain and Ireland, residing at London, England, have invented a new and Improved Electrical Measuring Instrument, (for which I have made application for Letters Patent in Great Britain under No. 13,617, bearing date June 30, 1899,) of which the following is a specification.

This invention relates to an improvement in instruments for measuring electrical current or pressure, and has for its object the construction of an exceptionally cheap and simple instrument which dispenses entirely with any pivoted moving part and has thus no rubbing frictional resistance when in operation and which may be used as a vertical or horizontal instrument in any position by suitable calibration and is not sensibly affected by slight divergencies from its normal position and is especially suitable for being inclosed in an oil-bath should such arrangement be desired.

Figure 1:
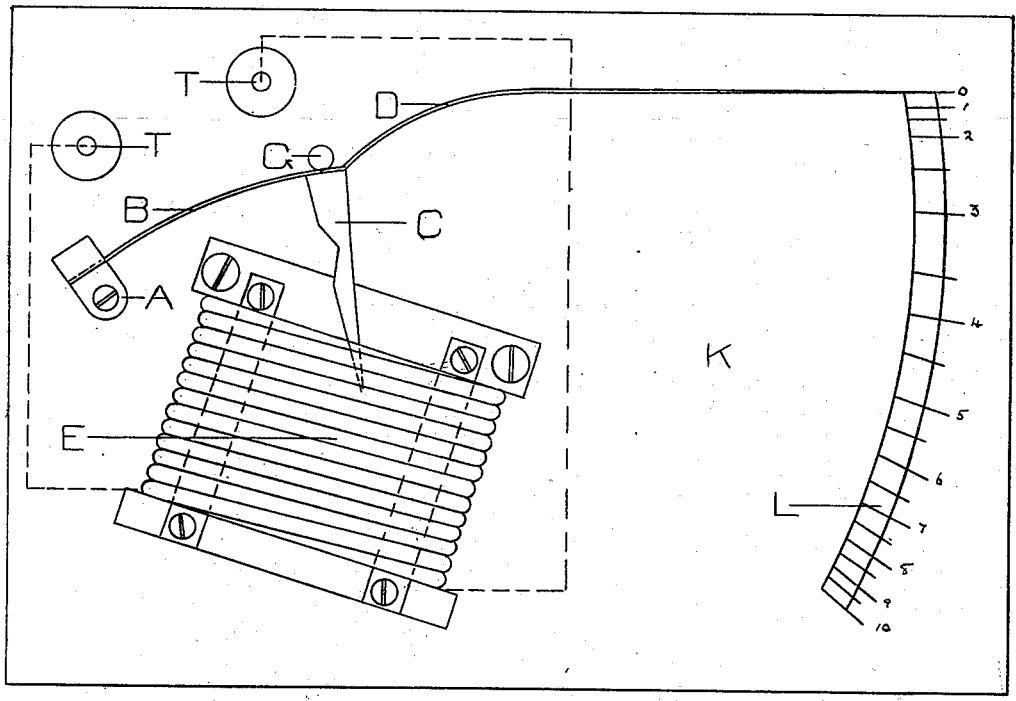
Figure 2:
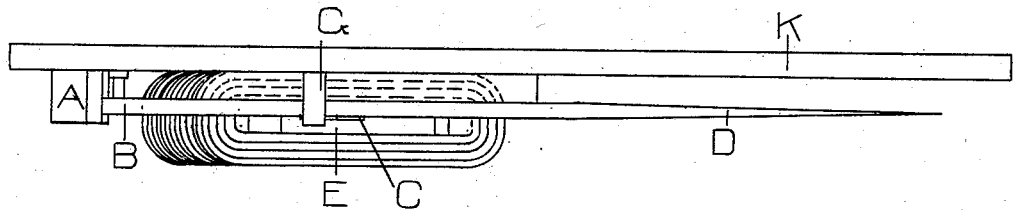

Figure 1 is a front elevation of my improved instrument. Fig. 2 is a plan of the same.

A is a clamp or bracket on a base board or plate K, to which is attached a spring B, of steel, phosphor-bronze, or resilient material, the outer end D of the spring B being extended and drawn out into or carrying a fine pointer giving a zero indication upon a suitably-calibrated scale L when the instrument is at normal and the spring B is just touching upon a check-pin G above it. To the said spring B, I attach a light soft-iron core C, which may conveniently be thin sheet or tinned iron.

This core C may be varied in shape as found desirable to give a best uniformity of increments of the movement of the spring B for variable amounts of current to be measured. I prefer the shape shown, in which the core is wedge-shaped, with a notch in one edge.

The object of the notching of the core is to alter its proximity to the attracting electromagnet at a particular point of the travel of the core therein, so as to give a best uniformity of increments of the movement of the spring B for variable amounts of current to be measured.

The current to be measured passes through a coil E by the terminals T T, such coil being conveniently flattened when the core C is a thin strip, so as to bring all the mechanism into little depth upon the base board or plate K; but it is obvious any form may be employed.

The core C when the current passes through the main coil E is attracted therein, the resilience of the spring B offering the necessary increasing resistance to measure the said attraction, and hence the current passing.

I prefer to form the fixed coil E without any iron core to diminish hysteresis; but a fixed iron core of any suitable shape may be employed in a well-known manner, if desired, to regulate or control the attraction of the coil E upon the core C.

I find a closed copper lining within the coil E is conducive to damping the oscillations of the spring B with continuous currents upon change of position and may thus form a convenient frame upon which to wind the coil E, or it may be inserted after it has been wound.

It is obvious that this instrument can be readily adapted to record its measurements by combination with a moving recording-surface in any of the well-known ways.

Having now particularly described my invention, what I claim, and desire to secure by Letters Patent, is—

1. In combination in an electrical measuring instrument, a flat spring fixed to baseboard at one end, and free to move at the other end drawn into or carrying a light indicating-point; a coil carrying the electrical current to be measured fixed to the baseboard; a metallic projection from said spring adapted to enter and be attracted into the body of said coil in proportion to current passing through the said coil; and a calibrated scale on base-board to indicate the amount of the transverse deflection of said spring under said magnetic attraction, substantially as described.

2. In combination in an electrical measuring instrument, a flat spring fixed to baseboard at one end, and free to move at the other end drawn into or carrying a light indicating-point; a flat coil carrying the electrical current to be measured fixed to the base-board, a core consisting of a wedge-shaped metal plate having a notch in one edge projecting from said spring, and adapted to enter and to be attracted into the body of the said fixed flat coil in proportion to the current to be measured; and a calibrated scale on base-board to indicate the amount of the transverse deflection of the said spring under the said magnetic attraction, substantially as described.

In witness whereof I have hereunto set my hand in presence of two witnesses.

ERNEST CECIL RIMINGTON.

Witnesses:
JOHN C. FELL,
REGINALD W. JAMES.